United States Patent [19]

Hou et al.

[11] Patent Number: 5,384,010

[45] Date of Patent: Jan. 24, 1995

[54] DEINKING WASTEPAPER PRINTED WITH WATER-BASED INK

[75] Inventors: Mean-Jeng Hou, Tega Cay, S.C.; Narayanasamy Seenivasan, Charlotte, N.C.

[73] Assignee: Hoechst Celanese Corporation, Somerville, N.J.

[21] Appl. No.: 113,152

[22] Filed: Aug. 27, 1993

[51] Int. Cl.[6] ............................................. D21C 5/02
[52] U.S. Cl. ........................................... 162/5; 162/4; 162/8; 162/55; 209/163; 210/704
[58] Field of Search ....................... 162/4, 5, 8, 55, 72; 209/163; 210/704

[56] References Cited

U.S. PATENT DOCUMENTS

| | | | |
|---|---|---|---|
| 5,211,809 | 5/1993 | Nadden et al. | 162/6 |
| 5,228,953 | 7/1993 | Bast et al. | 162/5 |
| 5,248,388 | 9/1993 | Richmann et al. | 162/5 |

OTHER PUBLICATIONS

L. D. Ferguson, "Deinking Chemistry: Part 1", *TAPPI Journal*, pp. 75–83 (Jul. 1992).
L. D. Ferguson, "Deinking Chemistry: Part 2", *TAPPI Journal*, 49–58 (Aug. 1992).
B. R. Read, "The Chemistry of Flotation Deinking", *TAPPI Proceedings, 1991 Pulping Conference*, pp. 851–856.
J. Jossinet, "Custom Deinking of Newsprint", *77th Annual Meeting Technical Section Canadian Pulp & Paper Association*, pp. 369–372 (1991).
L. D. Ferguson, "The Role of Pulper Chemistry in Deinking" *TAPPI Proceedings, 1991 Pulping Conference*, pp. 793–799.
T. W. Woodward, "Appropriate Chemical Additives Are Key to Improved Deinking Operations", *Pulp & Paper*, pp. 59–63 (Nov. 1986).
T. W. Woodward, "Deinking Chemistry", *1991 Chemical Processing Aids Short Course*, pp. 85–105.
A. Shrinath et al, "A Review of Ink-Removal Techniques in Current Deinking Technology", *July 1991 TAPPI Jouranl* pp. 85–93.
L. L. Tural et al, "Effect of HLB Factor of Nonionic Surfactants in Deinking Efficiency", *TAPPI Journal*, pp. 167–168 (Nov. 1977).
W. B. Darlington, "A New Process for Deinking Electrostatically-Printed Secondary Fiber", *January 1989 TAPPI Journal*, pp. 35–38.

(List continued on next page.)

*Primary Examiner*—W. Gary Jones
*Assistant Examiner*—Dean T. Nguyen
*Attorney, Agent, or Firm*—Rosemary M. Miano

[57] ABSTRACT

A process is disclosed for deinking pulp which has been made from paper printed with flexographic ink. The process uses a surfactant component made from a fatty acid or a fatty acid blend and at least one alkoxylated diamine selected from Formula I:

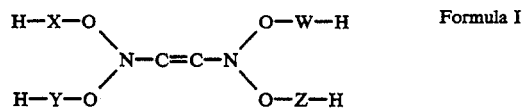

Formula I where X, Y, W and Z may be alike or different and are each independently selected from the group consisting of (i) $-(CH_2-CH(CH_3)-O)_a(CH_2-CH_2-O)_b-$;
(ii) $-(CH_2-CH_2)-O)_c(CH_2-CH(CH_3)-O)_d-$; and
(iii) random copolymers of ethylene oxide and propylene oxide, wherein a, b, c and d are each selected independently to be a number between 1 and 30 so as to give an HLB value between 5–15.

9 Claims, 1 Drawing Sheet

OTHER PUBLICATIONS

K. Schriver, "Mill Chemistry Must be Considered Before Making Deink Line Decision", *Pulp & Paper*, pp. 76–79 (Mar. 1990).

T. Quick et al, "Xerography Deinking–A Fundamental Approach", *TAPPI Journal*, pp. 102–106 (Mar. 1986).

J. M. Zabala et al, "Deinking at Papelera Peninsular and the Philosophy of Deinking System Design", *August 1988 TAPPI Journal*, 62–68.

D. Lachenal et al, "Hydrogen Peroxide as a Delignifying Agent", *TAPPI Journal*, pp. 199–122 (Apr. 1980).

R. G. Horacek et al, "Chemical Application Expands in Washing/Flotation Deinking Systems", *Pulp & Paper*, pp. 97–99 (Mar. 1989).

J. S. Aspler, "Newsprint Contributions to Reboff of Oil–Based Inks", *1990 International Printing and Graphic Arts Conference*, pp. 21–30.

K. Hornfeck, "Chemicals and Their Mode of Action in the Flotation Deinking Process", *Conservation & Recycling*, pp. 125–132 (1987).

J. T. Mattingley, "Residual Chemical Effects in Secondary Fibre Operations", *TAPPI Proceedings, 1983 Pulping Conference*, pp. 515–523.

D. W. Suwala et al, "A Study of the Deinking Efficiency of Monionic Surfactants", *TAPPI Proceedings, 1983 Pulping Conference*, pp. 533–541.

D. L. Wood, "Alcohol Ethoxylates and Other Nonionics as Surfactants in the Deinking of Waste Paper", *TAPPI Proceedings, 1982 Pulping Conference*, pp. 435–446.

W. C. Griffin, "Classification of Surface-Active Agents by HLB", *Journal of the Society of Cosmetic Chemists*, pp. 311–327.

Trade Literature–"Guideline Formulations: Part 1. Liquid Detergents" (Jun. 1993).

TAPPI, Standard Method T218 om-91, "Forming Handsheets for Reflectance Testing of Pulp (Buchner Funnel Procedure)", 1991.

DEINKING WASTEPAPER PRINTED WITH WATER-BASED INK

BACKGROUND OF THE INVENTION

Recycling of paper is taking on increasing importance as demands on resources increase. One of the aspects of recycling that is particularly challenging is the area of deinking. Various aspects of deinking are described in the literature. See, for example, L. D. Ferguson, "Deinking Chemistry: Part 1", *TAPPI Journal*, pages 75–83 (July 1992), and "Deinking Chemistry: Part 2", *TAPPI Journal*, pages 49–58 (August 1992); B. R. Read, "The Chemistry of Flotation Deinking", *TAPPI Proceedings*, 1991 *Pulping Conference*, pages 851–856; J. Jossinet, "Custom Deinking of Newsprint", *77th Annual Meeting Technical Section Canadian Pulp & Paper Association*, pages 369–372 (1991); L. D. Ferguson, "The Role of Pulper Chemistry in Deinking", *TAPPI Proceedings*, 1991 *Pulping Conference*, pages 793–799; T. W. Woodward, "Appropriate Chemical Additives Are Key to Improved Deinking Operations", *Pulp & Paper*, pages 59–63 (November, 1986); and T. W. Woodward, "Deinking Chemistry", 1991 *Chemical Processing Aids Short Course*, pages 85–105. Washing deinking and flotation deinking are the two major types of deinking processes. Some preference is given to flotation deinking because it uses less water.

One of the greatest challenges in the area of flotation technology is the increasing amount of wastepaper which has been printed with water-based inks. The switch to water-based inks has been due, in large part, to the concern over the environmental impact of oil-based inks and the desire to reduce or eliminate the use of solvents in printing. As one will appreciate, the separation of oil-based inks from pulp during a recycling process in a water based environment is easier than the separation of water-based inks from water based pulp. The two greatest problems in using flotation for flexographic inks are: (a) the particle size is small after repulping, at 0.2–1.0μ, and (b) the ink is hydrophilic and likes to remain with the water. (See discussion in the August, 1992 Ferguson article listed above at page 53–54.) Additionally, the systems that have been used by recyclers for oil-based ink separation are not always immediately adaptable to separations involving water-based inks. Contamination of regular furnish by water-based inks has caused significant problems by degrading the performance of deinking systems.

Various approaches have been tried to adapt flotation processes to flexographic inks. These approaches have included searching for chemicals that give improved results. Such chemicals have included collectors to remove the ink that has been released from the fiber (including fatty acids such as stearic acid), surfactants, displectors (combination of dispersants and collectors), water hardeners, and chelates.

Unlike oil-based ink, water-based ink has a water soluble polymer which carries and binds the ink to the substrate. A typical flexographic (water-based) ink formulation for newsprint may be on the order of 15% pigment, 70% water, 10% acrylic polymer, and 5% amines, defoamers, and other components. When the paper is pulped, these polymers (such as acrylic polymers) dissolve in the water, carry the ink throughout the pulp suspension, and redeposit onto the pulp fibers.

Flotation is not always useful in treating pulps containing water-based inks. Washing steps, even multiple washing steps are also not entirely satisfactory in removing residue from the pulp. For example, the gray water (the filtered water from the washing or thickening) may be recycled to the system and the resulting pulp is frequently darker than desired.

Bleaching steps have been used in conjunction with the deinking of flexographic materials to achieve brighter pulps.

Thus, an object of the present invention is to provide an improved process for deinking pulp which comes from sources containing flexographic (water-based) ink. It is a further object of this invention to provide a deinking process and deinking chemicals for flexographic ink which allows the use, in part, of flotation. These and other objects of the invention will be apparent from the following description.

SUMMARY OF THE INVENTION

This invention provides a method for deinking pulp which has been made from paper printed with flexographic ink. The method comprises pulping the paper with water at a temperature from 25 to 85 degrees C., particularly 35–55, in a neutral to mildly alkaline environment, diluting the pulp to the desired consistency, mixing the pulp with a from 0.5–3.0% by weight based on the oven-dried (OD) weight of pulp of a surfactant component made by combining 5–95% fatty acid or fatty acid blends selected from the group consisting of $C_{12}$ to $C_{22}$ fatty acids (carboxylic acids) and 95−5% of one or more alkoxylated diamines selected from the group consisting of Formula I:

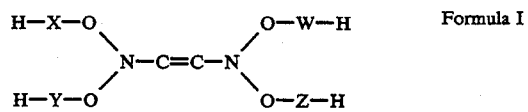

Formula I where X,Y,W and Z may be alike or different and are each independently selected from the group consisting of (i) —$(CH_2$—$CH(CH_3)$—$O)_a(CH_2$—$CH_2$—$O)_b$—;

(ii) —$(CH_2$—$CH_2$—$O)_c(CH_2$—$CH(CH_3)$—$O)_d$—; and (iii) random copolymers of ethylene oxide and propylene oxide wherein a,b,c and d are each selected independently to be a number between 1 and 30 so as to give an HLB value between 5–15.

The mixture is then treated in a flotation cell and dewatered using methods familiar to those in flotation cell technology to obtain the recycled product.

During the process, the alkalinity is adjusted and the pulping is controlled so that over-reduction of ink particle size is minimized or prevented, reasonable swelling of the pulp fiber is obtained, and entrapment of ink particles in the fibers is reduced or avoided. It is desired that the flexographic ink particles be agglomerated and hydrophobized for easier separation from the pulp fibers. Desirable particle sizes for these agglomerated materials are in the range of 10–200μ.

The process of this invention may be practiced so as to minimize the solids lost during the flotation process and it is preferred that this be done.

DETAILED DESCRIPTION OF THE DRAWING

Figure 1:
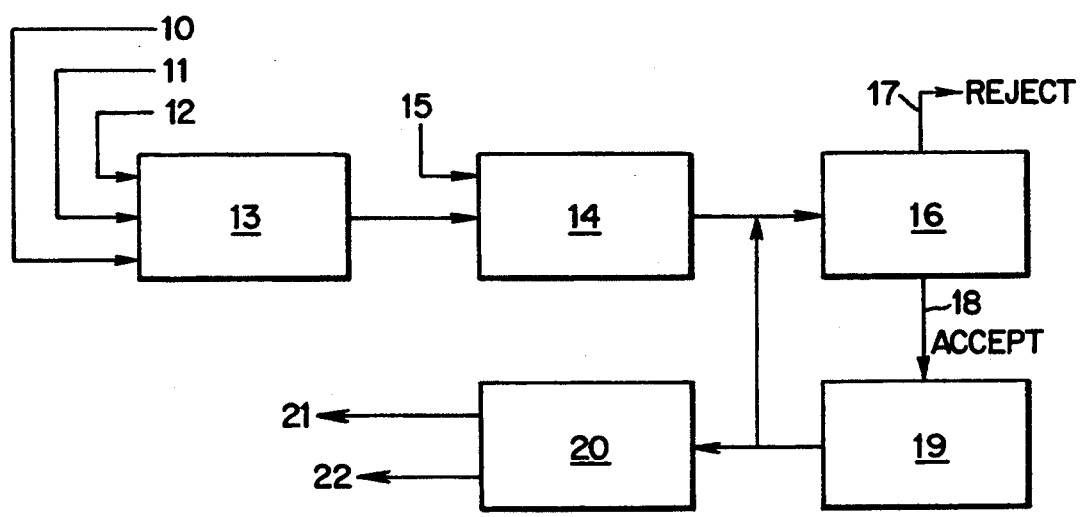
FIG. 1 shows a schematic diagram of a simpler deinking process suitable for use on a pilot plant level.

In FIG. 1, hot water 10, deinking chemicals (such as caustic, surfactants, and CaCl₂) 11, and furnish 12 made with paper printed with flexographic ink are charged to a pulper 13 at a temperature between 45 and 50 degrees C. (for example, 48–49 degrees C.), and a consistency of 7.5–15% (for example, 15%). If the hardness of water is more than 350 ppm (as CaCl₂), no addition of CaCl₂ is needed. The preferred hardness is in the range of 200 to 600 ppm (as CaCl₂). After pulping has been completed for the desired time 2–5 minutes, the slurry is transferred to a dilution tank. Dilution water 15 is added which is sufficient to reduce the consistency of the pulp to about 1% and the temperature is maintained at about 48–49 degrees C. The pulp slurry is then transferred to a flotation cell 16 and the flotation process is run for the desired time. Rejected material 17 is removed during flotation and placed in a suitable container. The deinked pulp 18 is transferred to an accept tank 19 where the temperature is maintained at about 45–48 degrees C. and the consistency is about 1%. The pulp is then transferred to a rotary drum washer at about 45–48 degrees C. and 1% consistency. The accept pulp 21 is then dewatered and the filtrate 22 is discarded or recycled after clarification.

DETAILED DESCRIPTION OF THE INVENTION AND DESCRIPTION OF THE PREFERRED EMBODIMENT

The process of this invention provides a method for deinking pulp containing flexographic ink wherein the method comprises first pulping the paper (which optionally may be preshredded) with water at a temperature from 25 to 85 degrees C., such as 35–55, in an aqueous alkaline environment. The alkaline environment is made by adding up to 0.5 percent by weight (based on the oven-dried weight of the fiber) of a base such as NaOH or soda ash. A pH range of 6.5–9.5 is particularly suitable. The aqueous slurry may also contain other additives such as chelates, sodium silicate, builders, bleaching agents such as hydrogen peroxide which have been added to the pulp slurry at various points in the pulping process. The alkaline pulp slurry is then diluted to form a pulp of the desired consistency. It is preferred that consistencies from 0.8% to 3.0%, such as 0.8% to 1.2%, and especially from 0.9% to 1.1% be used as they seem to give good results on deinking equipment currently available. The pulp slurry is then mixed with 0.5–3.0% of a surfactant component made with 5–95% of one or more fatty acids or fatty acid blends as described above such as those selected from $C_{14}$-$C_{20}$ (and preferably selected to be oleic acid or stearic acid), and 95–5% of at least one alkoxylated diamine of Formula I described above. More particularly, 85–50% of fatty acid or fatty acid blend may be used with 15–50% of a compound of Formula I. Preferably the fatty acid portion is 80–75% and the compound of Formula I is 20–25%. One example of a suitable material is Genapol® PN-30 (Hoechst Celanese Corporation, Somerville, N.J.). Genapol® PN-30 is an EO/PO block copolymer based on ethylene diamine with a total of 47 mole EO and 47 mole PO. Genapol® PN-30 can be described as a compound of Formula I with

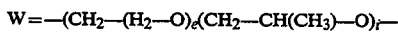

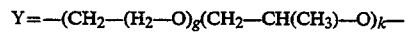

$Z = -(CH_2-(H_2-O)_h(CH_2-CH(CH_3)-O)_m-$, where $e+f+g+h=47$ and $i+j+k+m=47$

It is particularly suitable to add a compound of Formula I before charging the pulper with wastepaper and other chemicals.

Preferred compounds are those compounds of Formula I where each of a, b, c and d are independently selected from the integers 5–15.

The HLB number (hydrophile-lipophile balance or HLB system) is a quantitative way known to those skilled in the art of correlating the chemical structure of surfactant molecules with their surface activity. For compounds of Formula I the HLB number is preferably selected to be a number from 5–15.

It is also important that the process be conducted to minimize the loss of solid pulp during the flotation step. Care should be taken in selecting the degree of alkalinity so that the fibers are swollen enough to free the ink, but not so much that the fiber goes out in the waste with the ink. Over-reduction of particle size decreases the efficiency of deinking.

After pulping, the mixture is then processed through a flotation cell, drum washer and so on as shown in the diagram in FIG. 1. The flotation process may be repeated until a product of the desired brightness is achieved or until it no longer is cost effective to repeat the process. A washing process (for example, drum washing) is then used to lighten the product further and to raise the consistency. The slurry is finally dewatered and may be dried on a drum drier to obtain a finished product. Such methods are known in the art, including the references cited in the background of the invention. With respect to the flotation cell, the diluted pulp is cycled and recycled through the cell for 2 to 10 minutes.

All of the deinking surfactants described above are commercially available, although any mixtures referenced herein may have to be blended. Other compounds of Formula I which are not commercially available may be made by techniques known to those skilled in the art.

The equipment useful in practicing the method of this invention is described in more detail in the Examples. Some of the equipment was commercially available, some was custom made and other items are modifications of commercially available items. Commercially available equipment can be used. Note that Lionsurf ™ is a proprietary blend of nonionic surfactants.

EXAMPLES

The following Examples are offered as being illustrative of the invention but should not be construed as limitations thereon. All chemical symbols and abbreviations have their ordinary and accustomed meanings, unless otherwise indicated. Thus, mm is millimeter, cm is centimeter, m is meter, g is gram(s), degrees C. is for Centigrade, ppm is parts per million, min is minute, gpm is gallon per minute, psi is pounds per square inch, psig is pounds per square inch (gauge), O.D. is oven-dried, DTPA is diethylene triamine pentaacetic acid, min is minute(s). Note that the washing process involves diluting and then thickening the pulp (by dewatering).

Example 1
Preparation of Deinking Agents

A deinking formulation for these Examples is composed of two components: (a) a fatty acid or fatty acid blend (examples being oleic acid and stearic acid); and (b) a diamine alkoxylate (Genapol® PN-30 from Hoechst Celanese Corporation, Somerville, N.J.). For purposes of the Examples "Agent A" is formulated by mixing one part of Genapol® PN-30 directly with 2 parts of oleic acid in a container, followed by mixing with a stirrer to obtain a clear amber solution. "Agent B" is formulated by adding one part of Genapol® PN-30 to 2 parts of molten stearic acid, followed by mixing with a stirrer and cooling the mixture to obtain a paste.

Example 2
Laboratory Deinking Study

Newspaper printed by a flexographic process with water-based ink (*Charlotte Observer*, North Carolina) was shredded into pieces approximately 3 cm by 3 cm (1 inch by 1 inch) as waste paper furnish. A Hobart mixer modified for temperature control was used as the pulper. The pulper was charged with 1020 g of hot water (50 degrees C.), then with 0.5% NaOH (based on the oven-dried weight of the paper) and then 180 g of waste paper. Pulping was done at 50 degrees C. for 10 minutes to obtain a very dark slurry. After pulping, the slurry was diluted to 0.8–1.0% consistency, 3% of Agent A was added (based on the ovendried weight of the fiber), and the hardness of the water/pulp slurry was adjusted to 200 ppm $CaCl_2$ by adding 0.24 g $CaCl_2$. After gently mixing the slurry for a few minutes, the diluted slurry was charged to an in-house fabricated Denver type flotation cell and floated for 10 minutes. After flotation the slurry was drained through a modified dynamic drainage jar under in-house vacuum with a regular vacuum pump outlet. The dynamic drainage jar was modified by replacing the screen with a 100 mesh machine wire. Brightness pads were made for post-pulper, post flotation and post washing samples using the procedure described in Technical Association of the Pulp and Paper Industry (TAPPI) Standard T 218 om-91 (incorporated by reference herein in its entirety), except that the brightness pads were formed at 0.5% consistency to avoid excess washing. The brightness was determined from these pads using a Technidyne brightness meter and the data is found in Table I.

Example 3
Second Laboratory Deinking Study

A low consistency pulper of the type described in Example 2 was used. Hot tap water (760 g at 50° C.) was charged to the stainless steel beaker. To the water in the pulper was added 0.6 g of Agent B (as described in Example 1), 0.08 g of NaOH, and sufficient $CaCl_2$ to adjust the hardness of the water solution to 200 ppm $CaCl_2$. Shredded newspaper of the type described in Example 2 (40 g) was slowly added to the pulper while the stirrer was turning. Pulping was done at 50° C. for 25 minutes. The pulp was then diluted to 1% consistency with hot tap water at about 50 degrees C., the hardness was adjusted to 200 ppm $CaCl_2$, and the pulp was gently agitated at 50° C. for 5 minutes before flotation was started. Flotation was done in a Denver type flotation cell as described in Example 2 for 10 minutes. After flotation was finished, washing was performed in the modified dynamic drainage jar described in Example 2. Brightness pads were made from post-pulper, post-flotation and post-washing samples. The brightness of these pads was measured by a Technidyne brightness meter and the data is found in Table I. The fiber loss, as determined from the weight of solid from the reject, was 14% and the water loss was 7%. The data is found in Table I.

TABLE I

| Example No. | Brightness Data | | |
| --- | --- | --- | --- |
| | Post Pulper | Post Flotation | Post Washing |
| 2 | 37.6 | 44.4 | 48.96 |
| 3 | — | 51.11 | 52.41 |

Example 4
Pilot Plant Deinking Study

The deinking process of this Example was done with 100% of the type of newspaper described in Example 2, except that the newspaper was not shredded prior to its addition to the pulper. The schematic in FIG. 1 shows the general diagram of the steps in the process.

A high consistency pilot scale pulper (Formax 1800, from Adirondack Machine Corporation, Glens Falls, N.Y.) was connected to a custom-made continuous flotation cell of 28.5 liter (7.5 gallon) capacity, and a 0.3 m by 0.9 m (1 foot by 3 foot) pilot drum washer from Komline-Sanderson, New Jersey. The flotation cell has four inlets, located tangentially to a cylindrical container, for sparging fine air bubbles into the pulp. Depending on the size of the chamber, not all 4 inlets should be used at the same time. The pulp rises to the accept zone while circulating in the feed zone. The foam containing the ink is removed through the reject tube at the center of the cell, while the accept pulp is removed through the bottom of the accept zone.

Hot water (24.9 liters at 48°–49° C.) was charged to the pulper, followed by NaOH (2.6 g), sodium silicate (32.5 g) and Agent A (20.5 g) as described in Example 1. After the contents of the pulper were thoroughly mixed and dispersed, 1300 g of newspaper as described above in this Example were directly added to the pulper. The newspaper was slushed in the pulper at reduced speed (70% of the design speed) for 3–5 minutes and then the contents of the pulper were discharged to a tank where the slurry was diluted to a consistency of about 1% with hot water at 48°–49° C. The diluted slurry was allowed to stay in the feed tank for 5 minutes to ensure full de-flaking of high consistency pulp. During the flotation process, this 1% slurry was pumped through two inlets which were each constructed to pass contents from the inlets into the flotation cell at an angle which was tangential to the cell. It is also preferred that the inlets used at any given time be across the cell from each other. As the slurry was pumped into the cell through the two inlets the slurry was mixed with very fine air bubbles before entering the cell at 15 gpm. The accepted portion of the slurry from the flotation cell ("accept") was continuously recycled through the cell to the feed tank, back through the cell to the feed tank and so on for a period of 32–40 minutes. The accept from the flotation cell was subjected to this flotation process until the desired time had elapsed. The flotation time was calculated using the following equation:

$$F = t \times (v/V),$$

where F=flotation time (the retention time of slurry in the flotation cell), t=total run time, v=capacity of the cell, and V=volume of the cell. For this Example, $$F = 40 \times (7.5/30) = 10 \text{ minutes}$$

During flotation sampling was done at different times and the degree of deinking was also monitored visually. After flotation had been completed, the pulp slurry was washed by pumping the slurry at a consistency of about 1% to a drum washer to be dewatered and thickened to a consistency of about 20%. The vacuum applied during pickup and thickening of pulp is about 508 mm (20 inches) of mercury.

To prepare brightness pads, a sample of the thickened pulp (3.5 g of fiber based on oven-dried (O.D.) weight) was diluted to a 0.5% consistency and was filtered through a Reeve Angel Number 230 filter paper in a fritted glass Büchner funnel under an in-house vacuum pump as described above. Wet brightness pads were placed on pressing plates and pressed at 3.4 kg/cm² metric units (50 psi) for 2.5 minutes before being placed in drying rings to be dried overnight in a standard conditioning atmosphere as described in TAPPI T 402 om-88 incorporated herein by reference in its entirety. ISO brightness was measured by a Technidyne brightness meter on both felt and wire side of brightness pads after drying was completed. Four readings were taken for each side of the samples and four samples were used for each data point. The results of these measurements are recorded in Table II.

TABLE II

| Samples | Felt-Side Brightness | Wire-Side Brightness |
|---|---|---|
| Post-Pulper | 43.9 | 41.5 |
| 2 Min. Flotation | 50.1 | 48.4 |
| 4 Min. Flotation | 52.4 | 50.6 |
| 6 Min. Flotation | 54.8 | 52.3 |
| 8 Min. Flotation | 54.0 | 52.7 |
| 10 Min. Flotation | 54.2 | 53.1 |
| Post-Washing | 55.8 | 53.2 |

Example 5

Second Pilot Plant Deinking Study

In order to compare the use of a different surfactant, the same equipment described in Example 4 was used. The pulper was charged with 8.7 liters of hot water at 48°–49° C., NaOH (19.5 g), sodium silicate (32.5 g), H₂O₂ (26 g of 50% hydrogen peroxide), DTPA (1.95 g) and (13.0 g of Lionsurf ™ 727, from Lion Industries, Vancouver, Wash. The pulping was done at a temperature of about 48–49 degrees C. and a consistency of about 15% for 3–5 minutes. The rest of the procedure is the same as described in Example 4. ISO brightness determinations were made as described in Example 4 and the data is recorded in Table III. In contrast to the results obtained in Example 4, the deinking used in this Example 5 gave poorer results than that obtained in Example 4. This indicates that a typical deinking agent is not satisfactory for use with flexographic newsprint. Even with the use of 1% hydrogen peroxide and 0.15% DTPA noted above used to enhance the brightening of the pulp, the pulp deinked in this Example 5 was far darker than that deinked in Example 4. This effect is particularly seen in the data for the wire side of the samples.

TABLE III

| Samples | Felt-Side Brightness | Wire-Side Brightness |
|---|---|---|
| Post-Pulper | 48.6 | 30.95 |
| 2 Min. Flotation | 48.88 | 35.7 |
| 4 Min. Flotation | 50.01 | 36.39 |
| 6 Min. Flotation | 49.49 | 35.28 |
| 8 Min. Flotation | 50.19 | 34.32 |
| 10 Min. Flotation | 49.32 | 36.19 |
| Post-Washing | 54.58 | 36.29 |

Example 6

Mixed Pulp

This Example describes the efficacy of the process of this invention as applied to deinking pulp which comprises a mixture of newsprint some of which is printed with flexographic (water-based) ink and some of which is printed with offset (oil based) ink. For this Example, the waste paper used was 50% by weight of the newsprint of the type described in Example 2 and 50% of newsprint from the Wall Street Journal. All other conditions and procedures are as described in Example 4. The results are recorded in Table IV.

TABLE IV

| Samples | Felt-Side Brightness | Wire-Side Brightness |
|---|---|---|
| Post-Pulper | 43.9 | 41.5 |
| 2 Min. Flotation | 50.1 | 48.4 |
| 4 Min. Flotation | 52.4 | 50.6 |
| 6 Min. Flotation | 53.2 | 52.3 |
| 8 Min. Flotation | 54 | 52.7 |
| 10 Min. Flotation | 54.2 | 53.1 |
| Post-Washing | 55.8 | 53.2 |

What is claimed is:

1. A method for deinking pulp which has been made from paper printed with water-based ink wherein said method comprises:
   a) pulping the paper with water at a temperature of 25–85 degrees C. in neutral to mildly alkaline conditions;
   b) diluting the pulp to a consistency of 0.8–3.0%;
   c) mixing the pulp with 0.5–3.0% by weight (based on the oven-dried weight of the pulp) of a surfactant component made by combining 5–95% of a fatty acid or fatty acid blend selected from the group consisting of $C_{12}$-$C_{22}$ fatty acid and 95−5% of at least one alkoxylated diamine of Formula I:

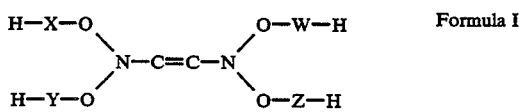

Formula I where X, Y, W and Z may be alike or different and are each independently selected from the group
   (i) —(CH₂—CH(CH₃)—O)$_a$(CH₂—CH₂—O)$_b$—;
   (ii) —(CH₂—CH₂)—O)$_c$(CH₂—CH(CH₃)—O)$_d$—; and
   (iii) random copolymers of ethylene oxide and propylene oxide, wherein a,b,c and d are each selected independently to be a number between 1–30 so as to give an HLB value between 5–15; and d) treating said pulp in a flotation cell wherein inks are removed from the pulp.

2. A process as claimed in claim 1 wherein the surfactant component comprises from 85–50% of said fatty acid or fatty acid blend, and from 15–50% of said compound of Formula I.

3. A process as claimed in claim 1 wherein the surfactant component comprises from 80–75% of said fatty acid or fatty acid blend, and from 20–25% of said compound of Formula I.

4. A process as claimed in claim 1 wherein said fatty acid component is selected from $C_{14}$-$C_{20}$ fatty acids.

5. A process as claimed in claim 1 wherein said fatty acid component is selected from the group consisting of oleic acid and stearic acid.

6. A process as claimed in claim 1 said consistency of said pulp is between 0.8–1.2% during the process.

7. A process as claimed in claim 1 wherein said compound of Formula I is an ethylene oxide/propylene oxide copolymer based on ethylene diamine with a total of 47 moles EO and 47 moles of PO.

8. A process as claimed in claim 1 wherein the process is carried out at a pH of 6.5–9.5.

9. A process as claimed in claim 1 wherein the process is carried out at a temperature of 35–55 degrees C.

* * * * *

UNITED STATES PATENT AND TRADEMARK OFFICE
CERTIFICATE OF CORRECTION

PATENT NO. : 5,384,010
DATED : January 24, 1995
INVENTOR(S) : Hou et al

It is certified that error appears in the above—identified patent and that said Letters Patent is hereby corrected as shown below:

Column 2, line 42 — after "(i) $-(CH_2-CH(CH_3)-O$" and before "$_a$", a — parenthesis (")") — should be inserted for the compound to read — (i) $-(CH_2-CH(CH_3)-O)_a(CH_2-CH_2-O)_b-$.

Signed and Sealed this

Fifteenth Day of August, 1995

Attest:

BRUCE LEHMAN

*Attesting Officer*     *Commissioner of Patents and Trademarks*